April 27, 1965 W. F. GORDON 3,181,116

UNDERWATER TELEPHONE SYSTEM

Filed Dec. 11, 1961 2 Sheets-Sheet 1

WILLIAM F. GORDON
INVENTOR
BY Ralph W. E. Bitner
ATTORNEY

April 27, 1965 W. F. GORDON 3,181,116
UNDERWATER TELEPHONE SYSTEM
Filed Dec. 11, 1961 2 Sheets-Sheet 2

WILLIAM F. GORDON
INVENTOR
BY Ralph W. E. Bitner
ATTORNEY

United States Patent Office 3,181,116 Patented Apr. 27, 1965

3,181,116
UNDERWATER TELEPHONE SYSTEM
William F. Gordon, 2011 Nostrand Ave., Brooklyn 10, N.Y.
Filed Dec. 11, 1961, Ser. No. 158,190
4 Claims. (Cl. 340—5)

This invention relates to an underwater telephone system which includes a single circuit means for transmitting a voice-modulated carrier wave and a double receiver circuit for receiving and demodulating two voice modulated carrier waves. The invention has particular reference to a means for determining the direction of a transmitted wave generated at a station installed at a home base.

The present invention is specifically for individuals who are under water and equipped with oxygen or air tanks for enabling them to remain under water for a considerable time. The use of communication systems for such persons has been quite limited because of the weight of the equipment and the usual large size of the containers necessary to house the batteries, the sending and receiving circuits, and the microphones and projectors. The present invention not only provides all the circuits necessary for two-way transmission of intelligence in a small package but also provides additional equipment for communication reception from a home base which may be a submarine or other stationary transmitting station.

In accordance with the present invention the electrical speech waves produced by a microphone, modulate a carrier frequency of about 10,000 cycles, this frequency being selected because it has been found by experiment that there is less noise existing under water at this frequency and the attenuation produced by currents and strata of temperature variations is not too great.

One of the objects of this invention is to provide an improved underwater telephone system which avoids one or more of the disadvantages and limitations of prior art arrangements.

Another object of the invention is to provide a telephone system for use between individuals under water which permits two-way transmission of speech intelligence with a minimum of noise.

Another object of the invention is to provide a double receiving circuit for the purpose of determining the direction of a master transmitter.

Another object of the invention is to provide a single side band transmission and receiving circuit without any carrier frequency, thereby eliminating all wave transmission when the microphone is not energized.

The invention comprises a transmission circuit which includes a microphone installed within the mask of a diver or attached to his throat. A band-pass filter is connected to the microphone and passes frequencies only between two and three thousand cycles, this frequency band being sufficient to transmit recognizable speech. The output of the filter is applied to a balanced modulator which is connected to an oscillator which produces power having a frequency of ten kilocycles. The output of the modulator contains frequencies from twelve to thirteen kilocycles and from seven to eight kilocycles. These frequencies are applied to a band-pass filter which suppresses the lower band and produces only the upper band of twelve to thirteen kilocycles. After amplification by a power amplifier, the energy is applied to a projector or transmitting hydrophone and the waves are transformed into sound impulses in water.

The receiving circuit includes the usual hydrophone receiver, an amplifier tuned to twelve to thirteen kilocycles, a band-pass filter for removing all the noise frequencies outside the transmitted band, a demodulator connected to the same carrier frequency oscillator, and a head phone which transforms the electrical waves into sound which may be heard by the individual.

Another feature of the invention includes a second receiving circuit similar to the one described above with the exception that the amplifier and band-pass filter are both tuned for the frequency range of seventeen to eighteen kilocycles and the demodulator is connected to the carrier frequency oscillator through a multiplier circuit which produces a carrier frequency wave of twenty kilocycles. The combination of the two receiver systems can be used in a number of ways; the most important of which is a direction finder for determining the direction of any transmitting station which sends out transmission on two carrier signals or two single side bands.

For a better understanding of the present invention together with other and further objects thereof, reference is made to the following description taken in connection with the accompanying drawing.

Figure 1:
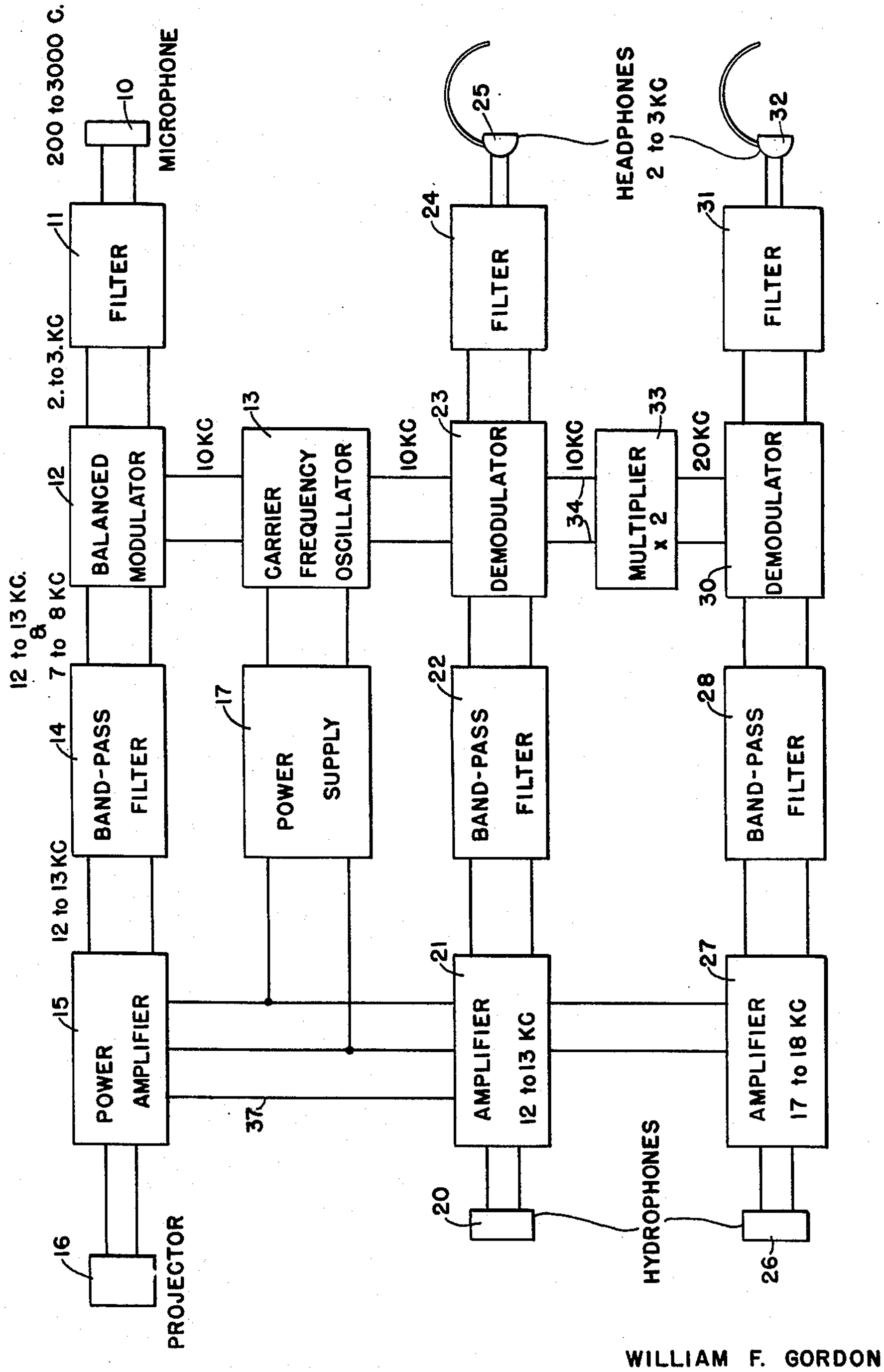
FIG. 1 is a schematic diagram of connections of the transmission and receiving circuits showing all the circuits in block form.

The transmission system includes a single transmission circuit and two receiver circuits. The transmission circuit includes a microphone 10 which is connected directly through a filter circuit 11 to a balanced modulator 12. An amplifier may be used in connection with the filter circuit but this is not always necessary and depends upon the type of microphone employed. It is well-known that the ordinary voice frequencies range between 200 cycles per second and 3,000 cycles per second, there being very little acoustic energy outside this band. It has been determined by experiment that the removal of all the lower frequency waves from 200 cycles per second to 2,000 cycles per second will still produce intelligent transmission and, for this reason, the filter 11 is arranged to transmit only these frequencies. Samples of band-pass filters may be found in "Radio Engineer's Handbook" by Terman, published by McGraw-Hill, New York 1943, pages 230 to 231.

The output of filter circuit 11 is applied to balanced modulator 12 which receives a sustained wave of 10,000 kilocycles from a carrier frequency oscillator 13. Circuits for producing a balanced modulation are described in the book referred to above, pages 551 to 553. The output of the balanced modulator contains no carrier frequency but only the upper and lower side bands are produced, in this case, 12 to 13 kilocycles and 7 to 8 kilocycles. These side band waves are applied to a band-pass filter 14 which suppresses the lower side band and transmits only those frequencies lying between 12 and 13 kilocycles. The output of filter 14 is applied to power amplifier 15 which amplifies the waves and applies them to a projector 16. Many types of projectors have been designed and used and are well-known. The construction of an efficient projector for ordinary speech waves has been considered to be a difficult design problem because of the variable pressures involved in under-water work. The projector used in the present system handles frequencies only from 12 to 13 kilocycles and for this reason it can be made smaller and more rugged than a projector which handles speech waves. The power amplifier, the carrier frequency oscillator, and other circuit units to be described later are all supplied with direct current power from a power supply unit 17. This power supply may be a collection of primary or secondary batteries or it may be a generator which generates electricity due to the variable pressures and currents encountered by an individual moving about under water.

The first receiver circuit includes a receiving hydrophone 20 which is connected to an amplifier 21 which is designed to amplify alternating currents within the range of 12 to 13 kilocycles. The output of amplifier 21 is applied to a band-pass filter 22 which is the same as filter 14 and is adapted to transmit all frequencies between 12 and 13 kilocycles per second. It should be noted that the filter 22, while not attenuating any of the side band frequencies, does suppress all frequencies outside of the 12 to 13 kilocycle frequency band and thereby eliminates at least 95 percent of all the noise generally associated with underwater systems. The output of filter 22 is connected directly to a demodulator 23. The carrier frequency oscillator output is mixed with the output of filter 22 and then the demodulator 23 rectifies the combination wave and supplies the result to a filter circuit 24 and a first head phone receiver 25.

A second receiver circuit includes a second hydrophone 26, and amplifier 27 similar to amplifier 21, and a band-pass filter 28 similar to band-pass filter 22. The ouput of filter 28 is applied to demodulator 30, the output of which is connected to filter 31 similar to filter 24, and the output of this filter is applied to a second head phone 32. The second receiver circuit uses a carrier frequency of 20,000 cycles and since only a single side band of frequencies is transmitted, the carrier frequency of 20,000 cycles must be supplied to the signal wave before it is demodulated.

A multiplier circuit 33 is connected between demodulator 23 and demodulator 30. Conductors 34 are an extension of the conductors connected to the output circuit of the carrier frequency oscillator 13 and this carrier freqency controls the multiplier circuit 33 to produce an output having twice the oscillator frequency.

The multiplier circuit 33 may comprise any one of the well-known circuits which can be controlled by a 10,000 cycle wave from the oscillator and produce an output frequency which is twice the input frequency or 20,000 cycles per second. The preferred multiplier circuit comprises a bistable multivibrator triggered by the input wave or a free running multivibrator whose natural frequency is about 19,000 cycles but responds to the input wave to produce 20,000 cycles. In order to control this circuit to produce exactly twice the frequency of the input circuit, the currents carried by conductors 34 are first rectified by a full wave rectifier and then differentiated to produce a series of sharp pulses having a repetition rate of 20,000 cycles per second. These pulses are applied directly to the two grids of the multivibrator and the circuit thereby is controlled to produce a frequency of exactly 20,000 cycles per second.

The demodulators 23 and 30 shown in the figure may be constructed in accordance with the designs outlined in the book referred to above on pages 553 to 578.

The operation of the above circuits is as follows: When an individual under water desires to talk to another individual within a reasonable range, he simply speaks into his microphone 10 and thereby sends out sound waves by means of projector 16 which projects frequencies within the band of 12 to 13 kilocycles per second. The other individual has the same equipment and receives the sound waves in water on hydrophone 20. The received intelligence is then amplified, filtered, demodulated, filtered a second time, and finally converted into audio frequencies in air by means of head phone 25. As described above, the second receiver system transmits waves only within the frequency range of 17 to 18 thousand cycles per second and ordinarily, when two individuals at close range are speaking to each other, there will be no sound produced by head phone 32. Intelligence is transmitted by the second receiver system only when a master transmitting circuit, generally considerably more powerful than the transmitter carried by an individual, transmits waves on both frequency bands to give orders to the individuals and to produce sounds in both head phones which can be used by the individual to determine the direction of the high-powered station.

It should be noted that there is no send-receive switch associated with the above circuits. Under these circumstances when one individual talks into his microphone, the sound waves emitted by the projector 16 will be picked up by hydrophone 20 and amplified to produce a loud sound in head phone 25. For moderate powers this feed-back or "side-tone" is not too objectionable.

Figure 2:
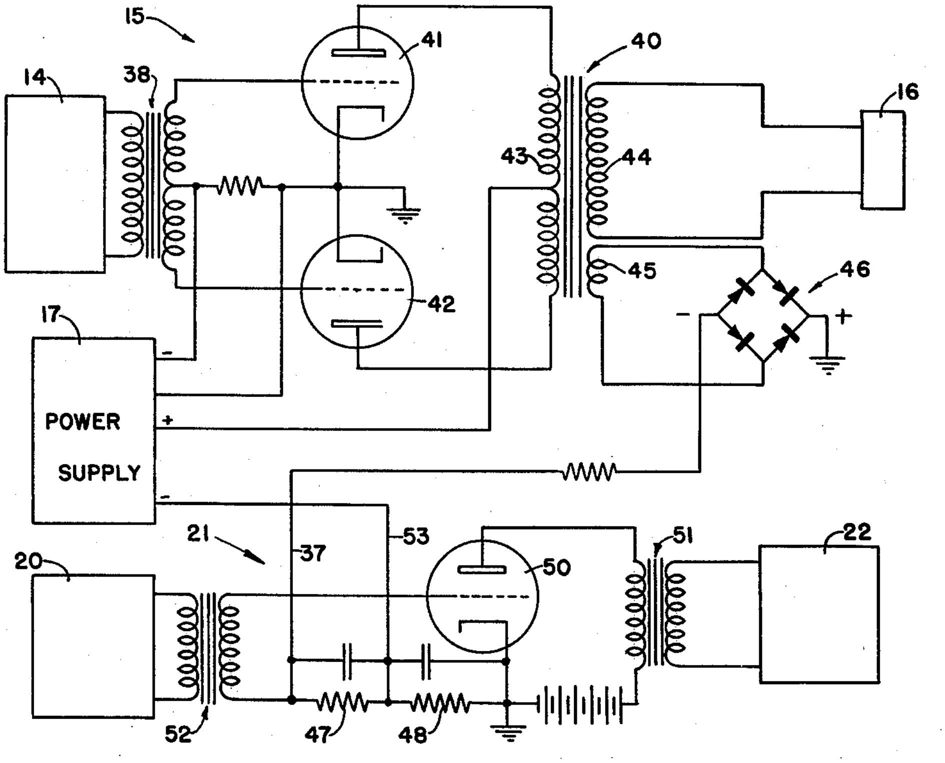
FIG. 2 is a schematic diagram showing one form of the power amplifier with a control connection to the receiver amplifier circuit.

There may be applications when the power emitted by the projector 16 must be increased considerably in order to increase the range of communication and to make the speech transmission more dependable. Under such conditions an automatic means must be provided in order to cut off the first receiver so that the acoustic energy produced by the projector will not be picked up by the head phone 25 and produce uncomfortable loud sounds. To correct this condition, an additional conductor 37 is connected between the power amplifier 15 and the receiver amplifier 21. The details of this circuit are shown in FIG. 2 where a vacuum tube power amplifier 15 receives its input from filter 14 by means of a transformer 38 and sends its output power to projector 16 by means of an output transformer 40. The vacuum tubes 41 and 42 may be any type of triode and the circuit and connections to the power supply 17 are conventional. It is obvious that transistors with appropriate circuitry may be substituted for the vacuum tubes.

The output transformer 40 includes a primary winding 43 and two secondary windings 44 and 45. Winding 44 is connected directly to projector 16 while winding 45 is connected to a bridge type rectifier 46 for full-wave rectification. The positive side of the bridge circuit is grounded and the negative rectifier terminal is connected by conductor 37 to the junction of resistor 47 and the secondary winding of transformer 52. Resistors 47 and 48 are connected in series between the grid and cathode of a triode vacuum tube 50 in the receiver amplifier 21. The receiver amplifier circuit is shown with an output transformer 51 connected to filter circuit 22 and having an input transformer 52 which receives its power from hydrophone 20. The other connections for this circuit are conventional and it is understood that a transistor amplifier with appropriate circuit connections can be used in place of triode 50.

The operation of the circuit shown in FIG. 2 is as follows: When there is no speech picked up by the microphone 10, there is no power transmitted by the power amplifier 15 since the carrier wave has been eliminated. Under these circumstances, there is no current in winding 45 and no voltage is transmitted over conductor 37. The power supply unit 17 sends a normal grid bias voltage over conductor 53 to bias the triode 50 for normal, efficient operation. As soon as sounds are picked up by the microphone 10 and transmitted through the transmission system, a voltage is generated in winding 45, the magnitude of which depends upon the volume of sound transmitted. This voltage is rectified by bridge rectifier 46 and the direct current component is transmitted over conductor 37 to add additional negative bias to the grid circuit of triode 50 thereby biasing the tube to a cut-off position so that very little voice signals are transmitted over this receiver system to head phone 25. There will always be some sounds which get through the system but these sounds have small volume and do not disturb the listener. It is believed that these residual sounds are an advantage since they form a "side tone" and assure the speaker that his transmission system is working properly. It should be noted that the suppression circuit shown in FIG. 2 is not the only type of suppression means which can be used to suppress the amplifier in the receiver system.

Figure 3:
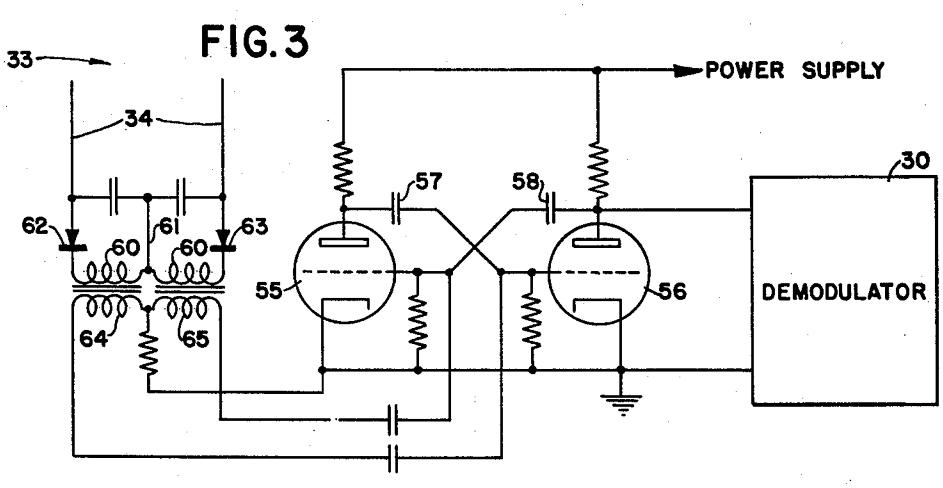
FIG. 3 is a schematic diagram showing one form of multiplier circuit.

The circuit diagram shown in FIG. 3 is one form of multiplier circuit which can be employed to change the 10 kilocycle carrier wave into a 20 kilocycle carrier wave.

Other circuits are well-known. The multiplier circuit shown in FIG. 3 includes two triodes 55 and 56 connected in the usual free running multivibrator circuit. The frequency of oscillation for this circuit is determined mainly by the value of capacitors 57 and 58. These values may be set so that the circuit would ordinarily produce a square topped wave of about 19 kilocycles. The 10 kilocycle frequency from oscillator 13 is applied to two windings 60 having a mid-point terminal 61. Two diode rectifiers 62 and 63 send half-wave pulses through windings 60 and produce pulses in primary windings 64 and 65, which occur at a rate of 20 kilocycles per second. A bistable multivibrator of 20 kilocycles could obviously be used instead of the described circuit.

The pulses generated in windings 64 and 65 are applied, through capacitors, to the grids of tubes 55 and 56 and thereby control their frequency of oscillation to exactly twice the frequency of the carrier wave oscillator 13.

From the above description it will be evident that an underwater telephone system can be employed to communicate between individuals at a reduced range and that the same system can be employed to receive signals from a master station and to determine its approximate direction.

The foregoing disclosure and drawings are merely illustrative of the principles of this invention and are not to be interpreted in a limiting sense. The only limitations are to be determined from the scope of the appended claims.

I claim:

1. An underwater telephone system for voice communication between individuals comprising;
   - a transmitting circuit which includes a microphone for converting acoustic energy into electric waves;
   - a carrier frequency oscillator for generating a selected carrier wave;
   - a balanced modulator connected to the microphone and to the carrier frequency oscillator for modulating the oscillator output by said waves to produce upper and lower side-band waves;
   - a projector connected to said modulator for converting one of the side-band waves into acoustic energy in water;
   - a first receiver circuit for receiving waves having side-band frequencies, said first receiver comprising a first hydrophone for converting acoustic waves in water into first electric signals, and a first demodulating circuit coupled to said first hydrophone for mixing said first electric signals with a portion of the output of said carrier frequency oscillator to create a first demodulated signal and for rectifying said first demodulated signal to thereby produce first audio signals, and a first acoustic transducer for converting said first audio signals into acoustic energy;
   - said system also including a second receiver circuit similar to the first receiver circuit but for receiving side-band waves having a second frequency differing from the first frequency;
   - said second receiver circuit comprising a second hydrophone for converting acoustic waves in water into second electric signals, a carrier frequency supply circuit, and a second demodulating circuit coupled to said second hydrophone for mixing said second electric signals with a signal derived from said carrier frequency supply circuit to create a second demodulated signal and for rectifying said second demodulated signal to thereby produce second audio signals, and a second acoustic transducer for converting said second audio signals into acoustic energy.

2. An underwater telephone system for voice communication as claimed in claim 1 wherein the output of the carrier frequency supply circuit is a frequency multiple of the frequency produced by the carrier frequency oscillator and wherein a multiplier circuit is employed in said supply circuit for creating the desired carrier frequency.

3. An underwater telephone system as claimed in claim 2 wherein said multiplier circuit contains a bistable multivibrator circuit.

4. An underwater telephone system as claimed in claim 2 wherein a power amplifier is connected between the balanced modulator and the projector for amplifying the side-band waves and a rectifier is coupled between said power amplifier and said first receiver circuit to produce a biasing potential for application to said first receiver circuit for cutting off the transfer of wave energy from the first hydrophone.

References Cited by the Examiner

UNITED STATES PATENTS

| | | | |
|---|---|---|---|
| 2,005,795 | 6/35 | Mathieu et al. | 325—153 |
| 2,007,211 | 7/35 | Nicolson | 340—6 |
| 2,144,936 | 1/39 | Rochow | 325—22 |
| 2,420,439 | 5/47 | Morrison | 340—6 |
| 2,522,367 | 9/50 | Guanella. | |
| 2,665,416 | 1/54 | Schuck | 340—6 |
| 2,798,902 | 7/57 | Kursman et al. | 340—5 |
| 2,834,955 | 5/58 | Tanner et al. | 325—368 |
| 2,867,731 | 1/59 | Henszey | 321—65 |
| 2,886,812 | 5/59 | Morgan | 325—22 |
| 3,024,441 | 3/62 | Saxton | 340—6 |

FOREIGN PATENTS

| | | | |
|---|---|---|---|
| 124,109 | 9/47 | Australia | 321—65 |
| 644,433 | 10/50 | Great Britain | 340—3 |

OTHER REFERENCES

"An Underwater Communication System" by Norman D. Miller, IRE Transactions on Communications Systems, vol. CS-7, No. 4, December 1959, pp. 249–251 reiled on.

CHESTER L. JUSTUS, *Primary Examiner.*

KATHLEEN CLAFFY, *Examiner.*